(12) United States Patent
Yanagawa et al.

(10) Patent No.: US 8,292,208 B2
(45) Date of Patent: Oct. 23, 2012

(54) WEBBING WINDING DEVICE

(75) Inventors: Wataru Yanagawa, Aichi-Ken (JP); Tomonori Nagata, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 175 days.

(21) Appl. No.: 12/895,469

(22) Filed: Sep. 30, 2010

(65) Prior Publication Data

US 2011/0079673 A1   Apr. 7, 2011

(30) Foreign Application Priority Data

Oct. 6, 2009   (JP) ................................. 2009-232693

(51) Int. Cl.
*B65H 75/48*   (2006.01)
(52) U.S. Cl. ...................................... 242/374; 242/379
(58) Field of Classification Search .................. 242/374, 242/379
See application file for complete search history.

(56) References Cited

U.S. PATENT DOCUMENTS

| 1,123,107 | A  | * | 12/1914 | Darr ................................. 52/684 |
| 7,546,968 | B2 | * | 6/2009 | Kitazawa et al. ............. 242/374 |
| 7,624,940 | B2 | * | 12/2009 | Kitazawa et al. ............. 242/374 |
| 2006/0169821 | A1 | * | 8/2006 | Kitazawa et al. ............. 242/382 |

FOREIGN PATENT DOCUMENTS

JP   2006-213131 A   8/2006
* cited by examiner

*Primary Examiner* — Sang Kim
(74) *Attorney, Agent, or Firm* — Roberts Mlotkowski Safran & Cole, P.C.

(57) ABSTRACT

Provided is a webbing winding device capable of mounting a holding member for holding a pretensioner on a frame easily. The webbing winding device has a holder which is mounted on a leg plate only by applying loads to tip ends (upper ends) of load receiving pieces and pushing the tip end (bent portion) sides of engagement claws into hole portions. With this structure, the operation of mounting the holder on the leg plate is easy and does not need any component such as screw. As no fastening component such as screw for mounting the holder on the leg plate is required, the cost for components is reduced and as no fastening step of screw is required, such cost is also reduced.

9 Claims, 5 Drawing Sheets

WEBBING WINDING DEVICE

CROSS-REFERENCE TO RELATED APPLICATION

This application claims priority under 35 USC 119 from Japanese Patent Application No. 2009-232693 filed Oct. 6, 2009, the disclosure of which is incorporated by reference herein.

BACKGROUND OF THE INVENTION

1. Field of the Invention

The invention relates to a webbing winding device capable of winding up and accommodating therein a webbing belt that constitutes a seat belt device of a vehicle.

2. Related Art

Japanese Patent Application Laid-Open (JP-A) No. 2006-213131 discloses a webbing winding device in which a cylinder of a pretensioner arranged at a side of a leg plate that constitutes a frame is fixed with a fixing tool screwed to the leg plate.

The fixing tool cannot fix the cylinder unless it is arranged over the cylinder in the radial direction. Therefore, the fixing tool needs to be screwed to the flame at least at two points including one side and the other side of the fixing tool via the cylinder.

SUMMARY OF THE INVENTION

In view of the aforementioned fact, the invention is to provide a webbing winding device that is capable of mounting a holding member for holding a pretensioner to a frame easily.

A webbing winding device of a first aspect, includes: a spool that is connected to a base end side in a longitudinal direction of a webbing belt formed in a longitudinal band shape and that winds up the webbing belt from the base end side in the longitudinal direction to accommodate the webbing belt; a pretensioner that imparts to the spool a rotational force in a direction of winding the webbing belt by activation thereof; a frame that rotatably supports the spool directly or indirectly, the frame having a wall portion where the pretensioner is disposed to face the wall portion, and a pair of hole portions whose distance therebetween along a predetermined direction parallel to a wall surface of the wall portion facing the pretensioner corresponds to a dimension of a predetermined portion of the pretensioner along the predetermined direction; and a holding member formed in a substantially U-shape opening toward the wall surface and having a pair of leg portions, a distance between the pair of leg portions corresponding to the dimension of the predetermined portion of the pretensioner along the predetermined direction, the holding member holding the pretensioner with the wall portion by the pair of leg portions being engaged with the pair of hole portions respectively.

Further, in the webbing winding device of the first aspect, the holding member includes a connecting portion connecting the pair of leg portions, and the holding member holds the pretensioner by sandwiching the pretensioner with the connecting portion and the wall portion and sandwiching the pretensioner with the pair of leg portions.

Further, in the webbing winding device of the first aspect, the pair of leg portions are inserted into the pair of hole portions respectively from a side opposite to the wall portion with respect to the pretensioner.

According to the webbing winding device of the first aspect, the spool is supported directly or indirectly by the frame, and in this spool, the longitudinal direction base end side of the webbing belt is connected. Further, the pretensioner is arranged at the side of the wall portion of the frame, and when this pretensioner is operated, the pretensioner gives the spool a rotational force in the direction of winding the webbing belt. Accordingly, when the pretensioner is operated in a state where the webbing belt is fit on the body of a vehicle occupant, slack in the webbing belt or the like is removed and constraint force of the webbing belt to the vehicle occupant's body is increased.

Here, in the webbing winding device of the predetermined invention, the holding member is provided at the predetermined portion of the pretensioner from the side opposite to the wall portion of the frame. The distance of the pair of leg portions that constitutes the holding member corresponds to the dimension of the predetermined portion of the pretensioner along the direction in parallel with the wall surface of the wall portion (the frame). When the leg portions of the holding member are engaged in the respective hole portions formed in the wall portion (the frame) to mount the holding member on the pretensioner, the predetermined portion of the pretensioner is sandwiched between both of the leg portions. With this structure, displacement of the pretensioner along the facing direction of the pair of leg portions is restricted thereby to hold the pretensioner.

Further, the holding member formed including the pair of leg portions is substantially concave shaped (U-shaped) opening toward the wall surface of the wall portion, and when the leg portions are engaged in the hole portions of the wall portion as described above, the predetermined portion of the pretensioner is sandwiched between the holding member (the connecting portion connecting the pair of leg portions) and wall portion. With this structure, displacement of the pretensioner along the facing direction of the holding member (the connecting portion connecting the pair of leg portions) and the wall portion is restricted to thereby hold the pretensioner.

Thus, mounting of the holding member for holding the pretensioner onto the wall portion is performed only by engaging the leg portions in the hole portions in the wall portion. Therefore, mounting of the holding member can be simple.

In the webbing winding device of a second aspect, according to the first aspect, the holding member has claw portions that are respectively formed outwardly at the leg portions in a facing direction of the pair of leg portions, from tip end sides of the leg portions, the claw portions being interfered with at a surface of the wall portion at a side opposite to the wall surface facing the pretensioner in a state where the leg portions pass through the hole portions respectively.

Further, in the webbing winding device of the second aspect, the predetermined portion of the pretensioner held by the holding member has a shape such that dimension thereof in the facing direction of the leg portions becomes gradually shorter from a position where the predetermined portion of the pretensioner is contacted and sandwiched by the pair of leg portions, toward the wall portion.

Further, in the webbing winding device of the second aspect, it is possible that the predetermined portion of the pretensioner held by the holding member has a cylindrical shape.

According to the webbing winding device of the second aspect, the claw portion is formed outwardly in the facing direction of the leg portions at the tip end side of each of the leg portions that constitutes the holding member. When the leg portion passes through the hole portion formed through the wall portion of the frame, the claw portion faces the surface of the wall portion at the side opposite to the wall surface. When the holding member is taken out from the frame in this state, the claw portion interferes with the surface, and displacement of the holding member in the direction of taking the holding member out of the frame is restricted by the wall portion of the frame. With this structure, the holding member is prevented from falling from the frame, and mounting of the holding member on the frame is maintained excellent for a long term. Further, the predetermined portion of the pretensioner held by the holding member has a shape such that dimension thereof in the facing direction of the leg portions becomes gradually shorter from a position where the predetermined portion of the pretensioner is contacted and sandwiched by the pair of leg portions, toward the wall portion.

Here, as described above, in the webbing winding device of this invention, each claw portion is formed outside in the facing direction of the leg portions. Therefore, when the leg portions are inserted into the hole portions, the tip end sides of the both leg portions are deformed (elastically deformed) in such a direction that they come close to each other until the claw portions get out from the hole portions completely. Here, as the predetermined portion held by the holding member in the pretensioner is shaped as described above, a gap is formed between the pretensioner at a side further toward the tip end side (that is, the claw portion sides) than the portion of each leg portion in contact with the pretensioner, therefore, elastic deformation is easy obtained so that the both leg portions become closer to each other. Therefore, mounting of the holding member on the frame is facilitated.

Further, in a state in which the holding member is mounted on the frame, the both leg portions are in contact with the predetermined portion of the pretensioner. Therefore, even if the leg portions are pushed such that the leg portions come close to each other at the side opposite to the claw portions with respect to the portion of the leg portions in contact with the predetermined portion of the pretensioner, due to the portion of the leg portions in contact with the predetermined portion of the pretensioner interferes with the predetermined portion of the pretensioner, deformation at the claw portion side than this portion in contact with the predetermined portion of the pretensioner is prevented or suppressed. Therefore, when an external force is applied to the leg portion accidentally, cancellation of facing state between the claw portions and wall portion of the frame is prevented or suppressed to prevent falling of the holding member from the frame or the like, and mounting of the holding member on the frame is maintained excellent for a long term.

In the webbing winding device of a third aspect, according to the second aspect, the holding member has load receiving portions formed in a flat plate shape, external force for mounting the holding member to the frame by passing the leg portions through the hole portions respectively being imparted at external force receiving positions of the load receiving portions, the external force receiving positions being set at positions each between a connecting portion connecting the pair of leg portions at a side opposite to the wall portion with respect to the pretensioner and a holding position of the leg portion in contact with the pretensioner to hold the pretensioner.

According to the webbing winding device of the third aspect, when the holding member is mounted on the frame, an external force is applied at each of the external force applied positions in the flat-plate shaped load receiving portions that form that holding member together with the claw portions, the pair of leg portions, the connecting portion for connecting these leg portions and the like. Here, the external force applied position of each load receiving portions is set between the above-mentioned connecting portion and the holding position where it in contact with the pretensioner to hold the pretensioner.

Therefore, both of the leg portions are likely to fall in the mutually facing direction by application of the external force to the holding member, the predetermined portion of the pretensioner is in contact with the leg potions so as to interfere therewith. With this structure, the leg portions are prevented from falling down.

A webbing winding device of a fourth aspect, includes: a spool that is connected to a base end side in a longitudinal direction of a webbing belt formed in a longitudinal band shape and that winds up the webbing belt from the base end side in the longitudinal direction to accommodate the webbing belt; a pretensioner that imparts to the spool a rotational force in a direction of winding the webbing belt by activating thereof; a frame that rotatably supports the spool directly or indirectly, the frame having a wall portion where the pretensioner is disposed to face the wall portion, and a pair of hole portions whose distance therebetween along a predetermined direction parallel to a wall surface of the wall portion facing the pretensioner corresponds to a dimension of a predetermined portion of the pretensioner along the predetermined direction; and a holding member formed in a substantially U-shape opening toward the wall surface and having a pair of leg portions, a distance between the pair of leg portions corresponding to the dimension of the predetermined portion of the pretensioner along the predetermined direction, the holding member holding the pretensioner with the wall portion by the pair of leg portions being engaged with the pair of hole portions respectively, wherein the holding member includes a connecting portion connecting the pair of leg portions, and the holding member holds the pretensioner by sandwiching the pretensioner with the connecting portion and the wall portion and sandwiching the pretensioner with the pair of leg portions, and the pair of leg portions are inserted into the pair of hole portions respectively from a side opposite to the wall portion with respect to the pretensioner.

According to the webbing winding device of the fourth aspect, effects which are obtained in the webbing winding device of the first aspect are obtained.

Further, in the above mentioned first to fourth aspects, it is possible that a concave portion whose shape corresponds to an outer peripheral shape of a portion of the predetermined portion of the pretensioner is formed at the wall portion where the predetermined portion of the pretensioner is disposed.

Further, it is possible that inclined surfaces that guide insertion of the pair of leg portions into the pair of hole portions are respectively formed at openings of the pair of hole portions at a side of the wall surface of the wall portion facing the pretensioner.

Further, it is possible that the shortest distance between inner peripheral surfaces of the pair of hole portions in a facing direction of the inner peripheral surfaces thereof is shorter than the dimension of the predetermined portion of the pretensioner along the predetermined direction, and the longest distance between the inner peripheral surfaces of the pair of hole portions in the facing direction of the inner peripheral surfaces thereof is longer than the dimension of the predetermined portion of the pretensioner along the predetermined direction.

As described above, the webbing winding device of the invention is able to mount the holding member for holding the pretensioner on a wall portion of the frame easily.

BRIEF DESCRIPTION OF THE DRAWINGS

Embodiments of the present invention will be described in detail with reference to the following figures, wherein.

DETAILED DESCRIPTION OF THE INVENTION

<Structure of Present Embodiment>

Figure 1:
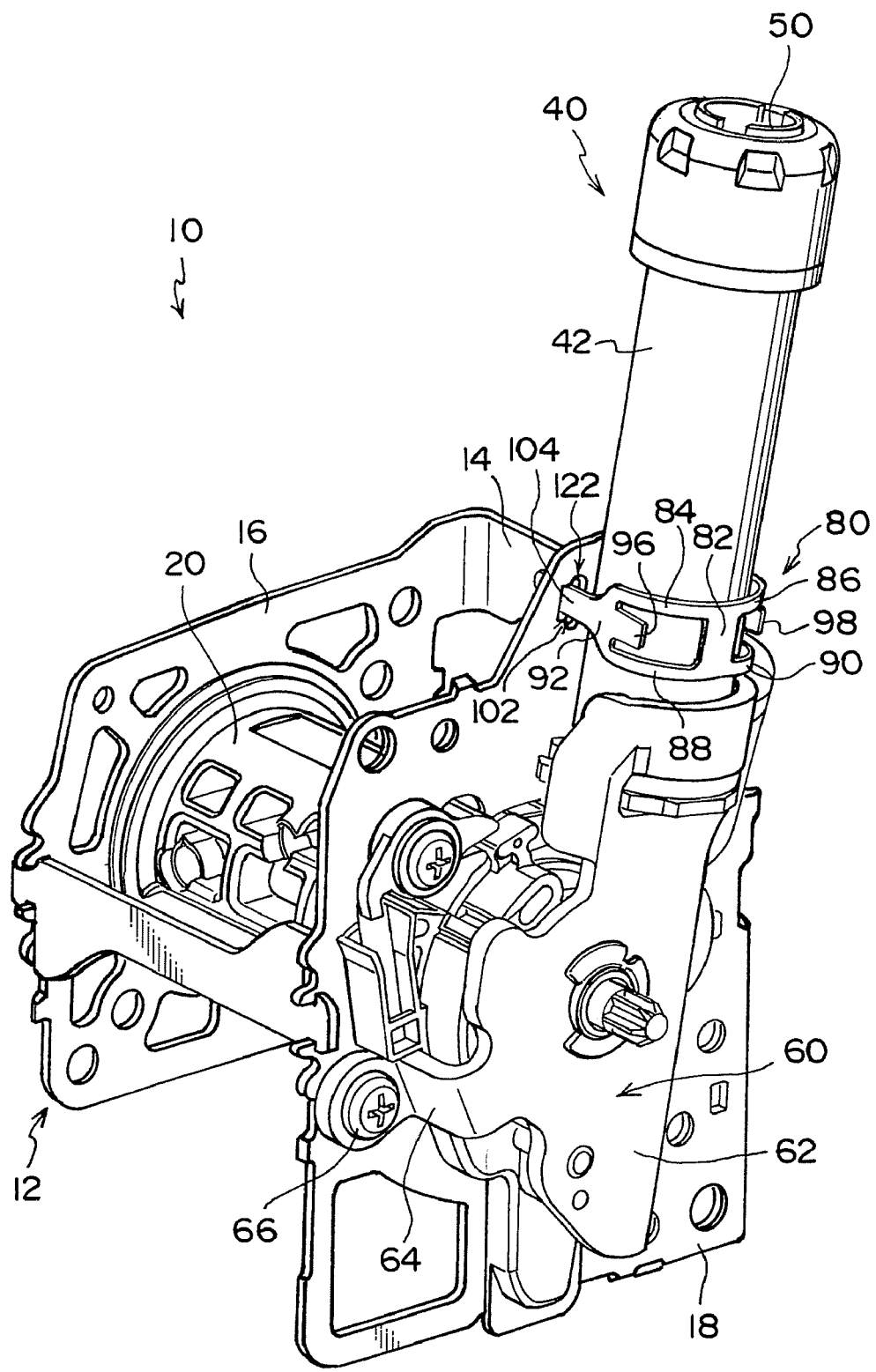
FIG. 1 is a perspective view illustrating a substantial portion and its surroundings of a structure of a webbing winding device according to one exemplary embodiment of the invention.

FIG. 1 is a perspective view illustrating a structure of a webbing winding device 10 according to one exemplary embodiment of the present invention.

As illustrated in FIG. 1, the webbing winding device 10 is provided with a frame 12. The frame 12 has an approximately flat plate shaped back plate 14. A flat plate shaped leg plate 16 extends from one width direction end portion of the back plate 14 toward one thickness direction side of the back plate 14. From the other width direction end portion of the back plate 14, a leg plate 18 extends, as a wall portion, in an extending direction of the leg plate 16 from the back plate 14. The frame 12 as a whole takes the shape of U in which the leg plate 16 faces the leg plate 18 in the width direction of the back plate 14.

Between the leg plates 16 and 18 of this frame 12, there is provided a spool 20. This spool 20 has a drum shape of which the axial direction extends along a facing direction of the leg plates 16 and 18. In this spool 20, a longitudinal direction base end side of a long band shaped webbing belt (not shown) is engaged. This webbing belt is drawn from the spool 20 to the upper side of the frame 12 (upward in FIG. 1) and when the spool 20 rotates in a winding direction that is one direction around the center axis, the webbing belt is wound up from its longitudinal direction base end side onto the outer periphery of the spool 20 and accommodated.

There is a spring case (not shown) mounted on the leg plate 16 at the outside of the leg plate 16 (opposite side of the leg plate 16 with respect to the leg plate 18). An axis portion (not shown) provided coaxial with the spool 20 at the end portion of the spool 20 at the side of the leg plate 16 is supported rotatable by the spring case and biased in the winding direction by the spring as spool biasing member.

Figure 5:
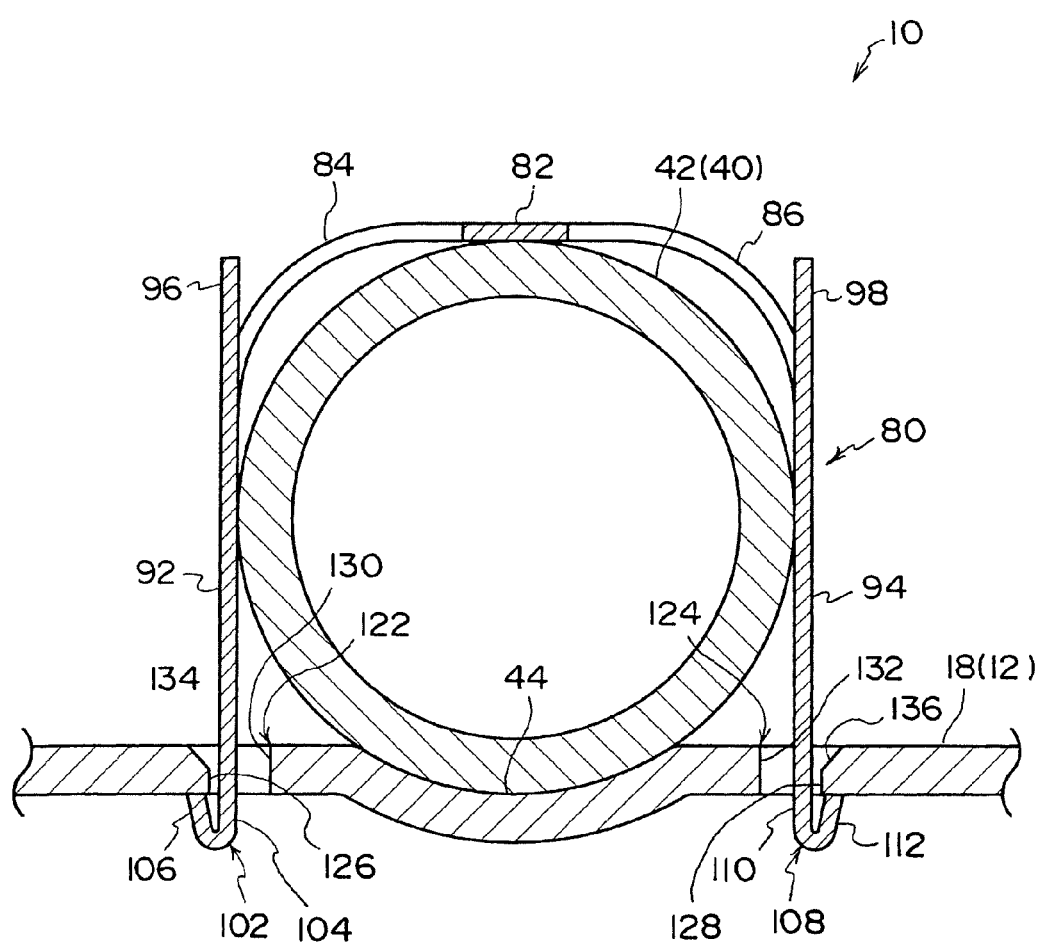
FIG. 5 is a cross sectional view corresponding to FIG. 3, illustrating the holding member mounted on the frame.

Meanwhile, there is a pretensioner 40 provided outside the leg plate 18 as the wall portion (opposite side of the leg plate 18 with respect to the leg plate 16). The pretensioner 40 has an approximately cylindrical cylinder 42. The cylinder 42 is set such that its axis direction is inclined, relative to the up and down direction of the frame 12, around the axis of the thickness direction of the leg plate 18, and in order to arrange the cylinder 42 at the side of the leg plate 18 in this state, as illustrated in FIG. 5, there is formed in the leg plate 18 a curved (concave) portion 44 that is curved so as to be open toward the side of the leg plate 18 opposite to the leg plate 16 and correspond to the outer peripheral surface of the cylinder 42.

On an axial direction upper end portion of the cylinder 42, a gas generator 50 is mounted. The gas generator 50 is electrically connected to a controller (ECU) (not shown). When the controller outputs an operation signal to the gas generator 50, a gas generation agent provided in the gas generator 50 is burned. When the gas generation agent is burned, gas is generated instantaneously. Thus generated gas is supplied from the axial direction upper end portion of the cylinder 42 into the cylinder 42 to increase the inner pressure inside the cylinder 42. Inside the cylinder 42, a piston (not shown) is provided and when the inner pressure inside the cylinder 42 is increased as described above, the piston slides downward toward the axial direction lower end side of the cylinder 42.

This piston is provided integrally with a rack bar (not shown). When the piston goes downward as mentioned above, a pinion (not shown) provided at a side of the axial direction lower end portion of the cylinder 42 is rotated in the winding direction by the rack bar. The pinion thus rotated in the winding direction is mechanically connected to the spool 20 by a clutch (not shown) and rotation force of the pinion in the winding direction is transmitted to the spool 20 so that the spool 20 is rotated in the winding direction forcibly.

There is provided a base portion 62 at the opposite side of the cylinder 42 to the leg plate 18. A cover plate 60 has the flat plate shaped base portion 62. The base portion 62 is opposed to the leg plate 18, and the abovementioned pinion, rack bar, clutch and the like are arranged between the leg plate 18 and the base portion 62. A leg piece 64 extends from an outer periphery of the base portion 62 and a tip end portion of this leg piece 64 is fixed to the leg plate 18 by the screw 66 and thus, the cover plate 60 is mounted on the leg plate 18.

Figure 2:
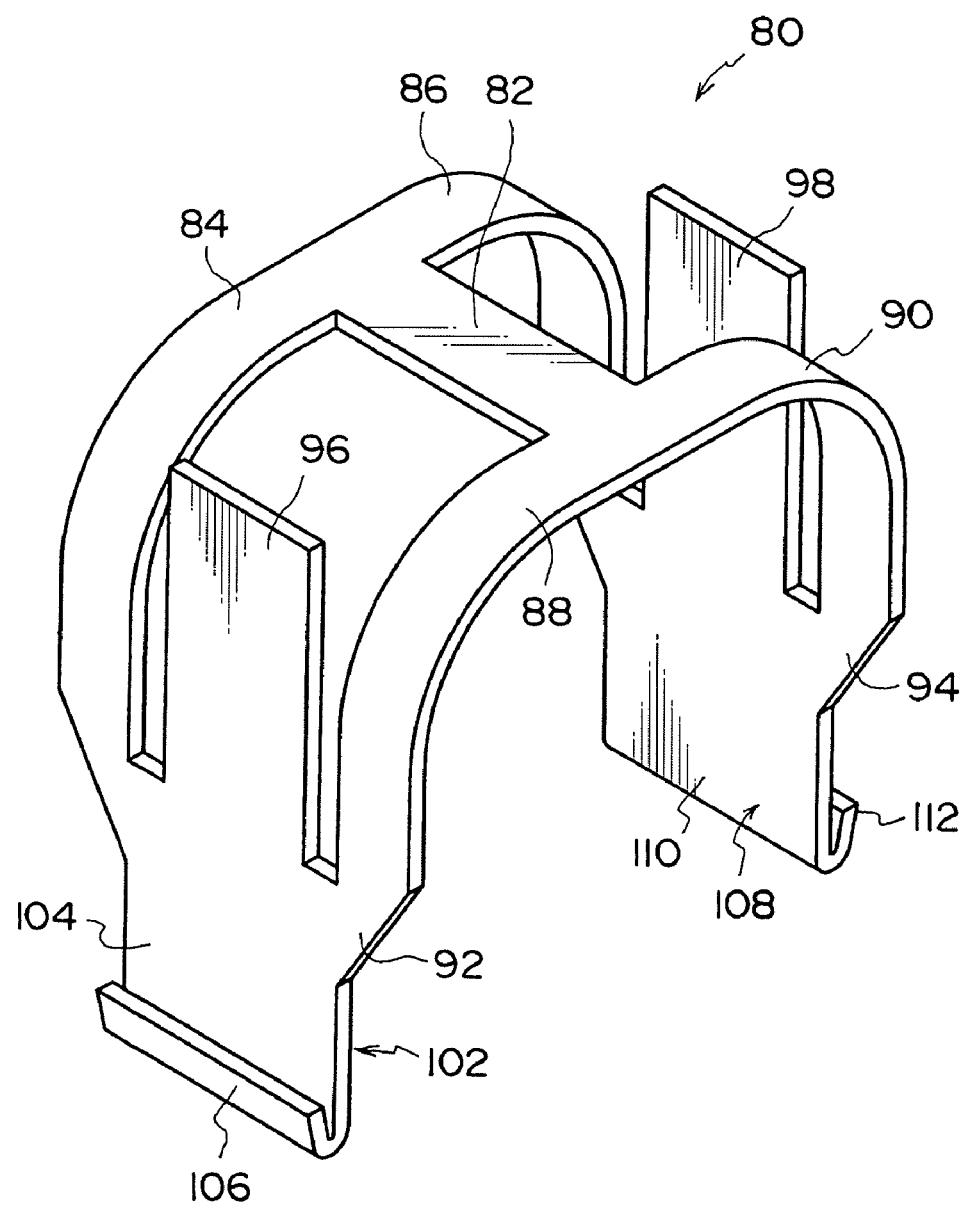
FIG. 2 is a perspective view of holding member.

At the upper side of this cover plate 60, a holder 80 is provided as a holding member. Here, FIG. 2 is a perspective view illustrating the holder 80 enlarged. As illustrated in FIG. 2, the holder 80 has a pressing piece 82 as a connecting portion. The pressing piece 82 is flat plate shaped in which its thickness direction is taken almost along the thickness direction of the leg plate 18 and its longitudinal direction is taken along the axial (longitudinal) direction of the above-mentioned cylinder 42.

From a longitudinal direction one end portion of this pressing piece 82, a catching (sandwiching) piece 84, structuring the leg portion, extends toward one width direction of the pressing piece 82 at the outer side and a catching piece 86, structuring the leg portion, extends toward the other width direction of the pressing piece 82 at the outer side. These catching pieces 84 and 86 are curved (or bent) toward the leg plate 18 at the middle portion along the extending direction from the pressing piece 82, and at the tip end side beyond the curved (bent) portion, the catching piece 84 faces the catching piece 86 with a space equal to the outer diameter of the above-mentioned cylinder 42.

Beside, from the other longitudinal direction end of the pressing piece 82, a catching piece 88, structuring the leg portion, extends toward one width direction of the pressing piece 82 at the outer side, and a catching piece 90, structuring the leg portion, extends toward the other width direction of the pressing piece 82 at the outer side. Similar to the above-mentioned catching pieces 84 and 86, these catching pieces 88 and 90 are curved (or bent) toward the leg plate 18 at the middle portion along the extending direction from the pressing piece 82, and at the tip end side beyond the curved (bent) portion, the catching piece 88 faces the catching piece 90 with a space equal to the outer diameter of the above-mentioned cylinder 42 as well as the above-mentioned catching pieces 84 and 86.

There is provided a connecting piece 92 structuring the leg portion at the tip end side of the catching pieces 88 and 84. The connecting piece 92 is formed like a flat plate whose thickness direction is taken along the width direction of the pressing piece 82. The connecting piece 92 is connected to the tip end portion of the catching piece 84 at one width direction end at one side of the connecting piece 92 taken along the axis (longitudinal) direction of the cylinder 42, and also the connecting piece 92 is connected to the tip end portion of the catching piece 88 at one width direction end at the other side of the connecting piece 92 along the axis (longitudinal) direction of the cylinder 42.

On the other hand, a connecting piece 94 structuring the leg portion is provided at the tip end side of the catching piece 90 and the catching piece 86. The connecting piece 94 is formed like a flat plate whose thickness direction is taken along the width direction of the pressing piece 82 like the connecting piece 92. The connecting piece 94 faces the connecting piece 92 with a gap approximately equal to the outer diameter of the cylinder 42. In this connecting piece 94, the connecting piece 94 is connected to the tip end portion of the catching piece 86 at one width direction end at one side of the connecting piece 94 taken along the axis (longitudinal) direction of the cylinder 42, and also the connecting piece 94 is connected to the tip end portion of the catching piece 90 at one width direction end at the other side of the connecting piece 94 along the axis (longitudinal) direction of the cylinder 42.

Figure 3:
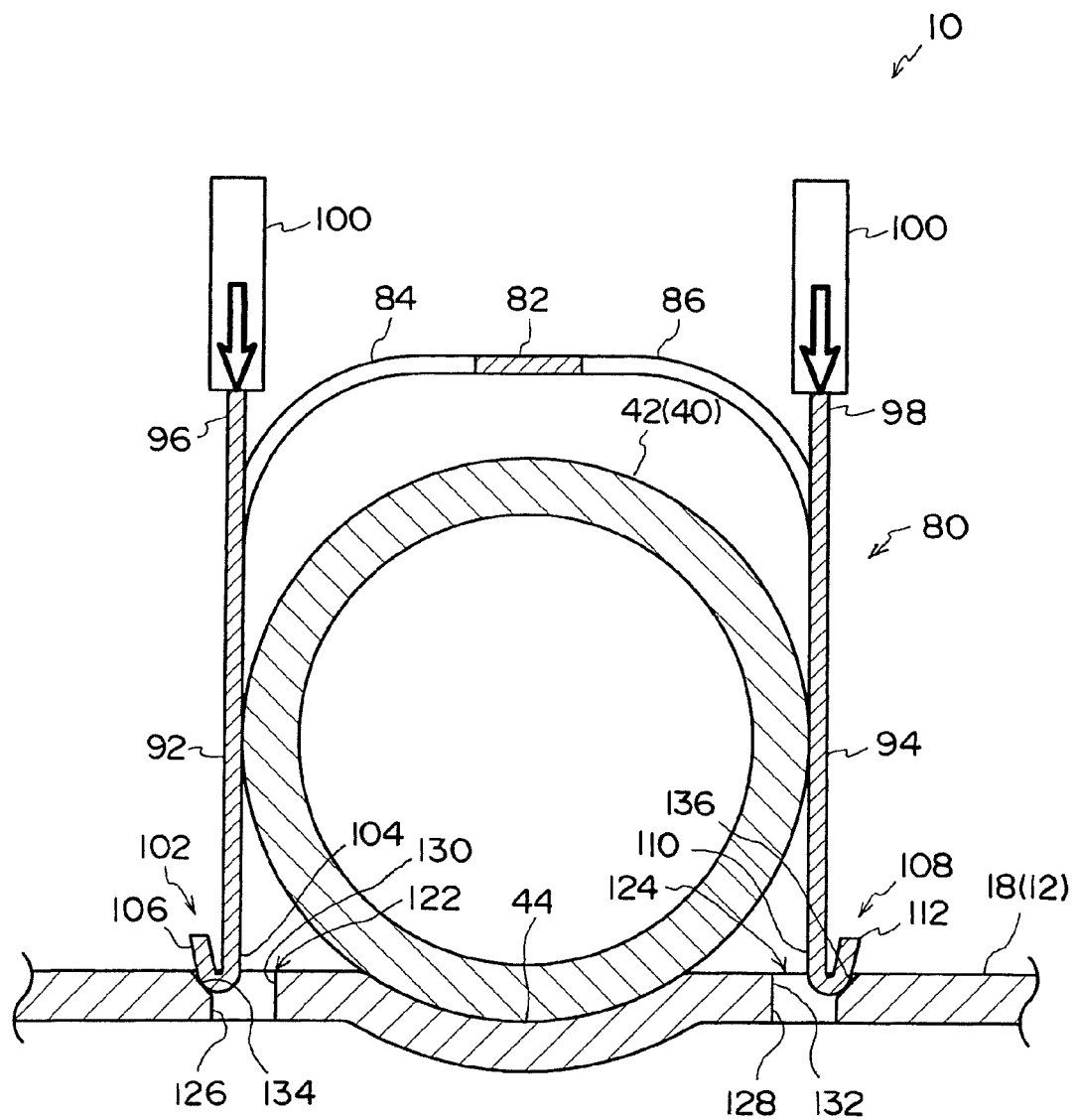
FIG. 3 is a cross sectional view illustrating a tip end side of a leg portion in contact with a guide portion when the holding member is mounted on a frame.
Figure 4:
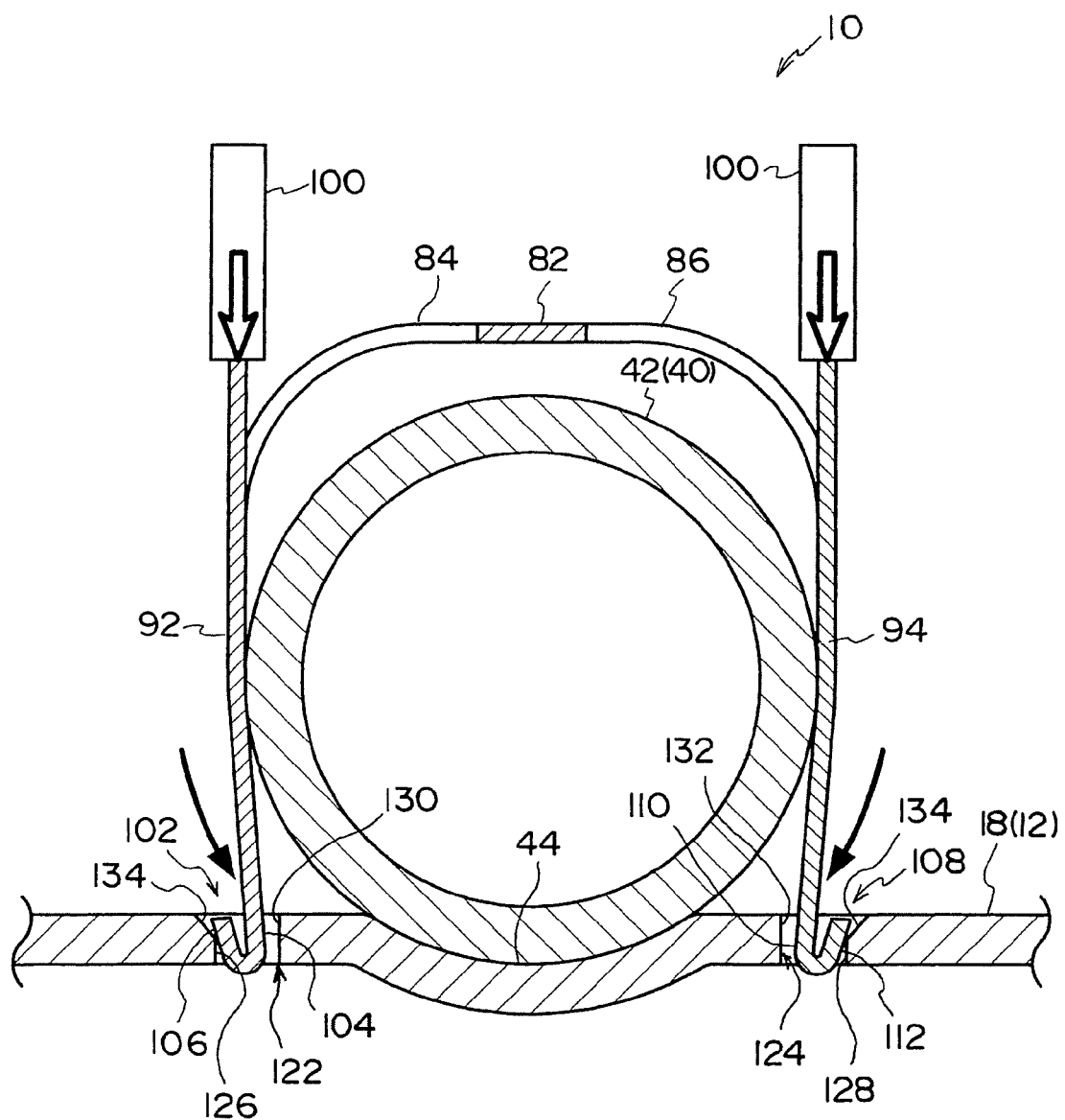
FIG. 4 is a cross sectional view corresponding to FIG. 3, illustrating elastic deformation of the leg portion due to a reaction force of the guide portion.

Besides, between the above-mentioned catching pieces 84 and 88, there is provided a load receiving piece 96 as a load receiving portion. Between the catching pieces 86 and 90, there is provided a load receiving piece 98 as a load receiving portion. The load receiving piece 96 extends from a middle portion of the connecting piece 92 and the load receiving piece 98 extends from a middle portion of the connecting piece 94. When the holder 80 is mounted on the leg plate 18, as illustrated in FIGS. 3 and 4, an assembly jig 100 is brought against the tip end portion of each of the load receiving pieces 96 and 98, and a load is applied to each tip end portion directly from the assembly jig 100 or by a hammer or the like via the assembly jig 100.

On the other hand, as illustrated in FIGS. 2 and 5, an engagement claw 102 extends from a side opposite to the side where the load receiving piece 96 is provided in the connecting piece 92. The engagement claw 102 has a base portion 104 structuring the leg portion. The base portion 104 is formed like a flat plate of which the thickness direction is taken along the thickness direction of the connecting piece 92. A base end portion of this base portion 104 is continuous to the connecting piece 92. From the tip end of the base portion 104, a claw portion 106 is formed continuously. The claw portion 106 is formed by folding a portion corresponding to the claw portion 106 of the engagement claw 102 that is as a whole formed like a flat plate, toward the outside along the facing direction of the connecting piece 92 and the connection piece 94 and toward the connecting piece 92.

Besides, an engagement claw 108 extends from the opposite side to the side where the load receiving piece 98 is provided in the connecting piece 94. The engagement claw 108 has a base portion 110 structuring the leg portion. The base portion 110 is formed like a flat plate of which the thickness direction is taken along the thickness direction of the connecting piece 94. A base end portion of this base portion 110 is continuous to the connecting piece 94. From a tip end portion of the base portion 110, a claw portion 112 is formed continuously. The claw portion 112 is formed by folding a portion corresponding to the claw portion 112 of the engagement claw 108 that is as a whole formed like a flat plate, toward the outside along the facing direction of the connecting piece 92 and the connection piece 94 and toward the connecting piece 94.

A distance between the tip end portion of the claw portion 106 or the tip end portion of the claw portion 112 and a surface, at a side facing the leg plate 18, of the pressing piece 82, along the thickness direction of the pressing piece 82, is approximately equal to a length obtained by subtracting a length of the deepest portion of the curved portion 44 from the surface (that is the wall surface of the leg plate 18) at the side facing the pressing piece 82 of the leg plate 18 from a sum of a thickness of the leg plate 18 and the outer diameter of the cylinder 42 equal to a length obtained by subtracting a length of the deepest portion of the bent portion 44 from the surface (that is the wall surface of the leg plate 18) at the side facing the pressing piece 82 of the leg plate 18 and a thickness of the leg plate 18 from the outer diameter of the cylinder 42.

The thus-structured holder 80 is formed by punching one metal flat plate such that a blank between the catching piece 86, the catching piece 90 and the load receiving piece 98 and a blank between the load receiving piece 96, the catching piece 88 and the catching piece 84 are formed, and bend-forming.

As illustrated in FIG. 5, the leg plate 18 has a hole portion 122 formed corresponding to the engagement claw 102 at one width direction side of the opining of the curved portion 44 with respect to the curved portion 44 and a hole portion 124 formed corresponding to the engagement claw 108 at the other width direction side of he opening of the curved portion 44 with respect to the curved portion 44. The hole portion 122 has a hole portion main body 126 and the hole portion 124 has a hole portion main body 128. Each of the hole portion main bodies 126 and 128 is formed in the leg plate 18 further than the thickness direction middle portion of the leg plate 18 toward the leg plate 16 side, and is open in an approximately rectangular shape in the surface of the leg plate 18 at the leg plate 16 side.

The distance between an edge portion of the hole portion main body 126 at the hole portion main body 128 side and an edge portion of the hole portion main body 128 at the hole portion main body 126 side is set shorter than the diameter of the cylinder 42. In addition, the distance between an edge portion of the hole portion main body 126 at the side opposite to the hole portion main body 128 and an edge portion of the hole portion main body 128 at the side opposite to the hole portion main body 126 is set longer than the diameter of the cylinder 42. The distance between an edge portion of the hole portion main body 126 at the side opposite to the hole portion main body 128 and an edge portion of the hole portion main body 128 at the side opposite to the hole portion main body 126 is set shorter than the distance between the tip end of the claw portion 112 and the tip end of the claw portion 106 in the facing direction of the connecting pieces 92 and 94.

There is formed a guide portion 130 continuous from the end portion of the hole portion main body 126 at the side opposite to the leg plate 16 and there is formed a guide portion 132 continuous from the end portion of the hole portion main body 128 at the side opposite to the leg plate 16. The guide portion 130 is open in the surface of the leg plate 18 at the side opposite to the leg plate 16 (wall surface of the leg plate 18) and accordingly, the hole portion 122 passes through the leg plate 18. The inner wall of the guide portion 130 at the hole portion 124 side is approximately in plane (flush) with the inner wall of the hole portion main body 126 at the hole portion 124 side, however, the inner wall of the guide portion 130 at the side opposite to the hole portion 124 is a guide surface 134 that is inclined in such a manner that it is gradually separated from the hole portion 124 as it goes to the open end, which is at the side of the leg plate 18 opposite to the leg plate 16, of the guide portion 130 (hole portion 122).

On the other hand, the guide portion 132 is open at the surface of the leg plate 18 opposite to the leg plate 16 (wall surface of the leg plate 18) like the guide portion 130, and therefore, the hole portion 124 passes through the leg plate 18. The inner wall of the guide portion 132 at the hole portion 122 side are approximately in plane (flush) with the inner wall of the hole portion main body 128 at the hole portion 122 side, however, the inner wall of the guide portion 132 at the side opposite to the hole portion 122 is a guide surface 136 that is inclined in such a manner that it is gradually separated from the hole portion 122 as it goes to the open end, which is at the side of the leg plate 18 opposite to the leg plate 16, of the guide portion 132 (hole portion 124).

The distance between the end portion of the guide surface 136 at the side opposite to the hole portion main body 128 and the end portion of the guide surface 134 at the side opposite to the hole portion main body 126 is set larger than the distance between the surface of the base portion 110 (engagement claw 108) at the side opposite to the engagement claw 102 and the surface of the base portion 104 (engagement claw 102) at the side opposite to the engagement claw 108. Therefore, in mounting of the holder 80 onto the leg plate 18, when the holder 80 is made closer to the leg plate 18, the bent portion of the engagement claw 102 at the boundary between the base portion 104 and the claw portion 106 abuts to the guide surface 134 and the bent portion of the engagement claw 108 at the boundary between the base portion 110 and the claw portion 112 abuts to the guide surface 136.

<Operation and Effect of This Embodiment>

Next description is made about the operation and effect of this exemplary embodiment with explanation of mounting of the holder 80 on the leg plate 18.

The cylinder 42 of the pretensioner 40 is abutted to the leg plate 18, and while the cylinder 42 is positioned relative to the leg plate 18 placed along the axial direction of the cylinder 42, as illustrated in FIG. 3, the holder 80 is placed near the leg plate 18 from the side of the leg plate 18 opposite to the leg plate 16 in such a manner that the cylinder 42 is entered between the connecting piece 92 and the base portion 104 (the engagement claw 102) and the connecting piece 94 and the base portion 110 (the engagement claw 108). When the holder 80 approaches to the leg plate 18 in this way, the bent portion of the engagement claw 102 at the boundary between the base portion 104 and the claw portion 106 abuts to the guide surface 134 and the bent portion of the engagement claw 108 at the boundary between the base portion 110 and the claw portion 112 abuts to the guide surface 136.

As illustrated in FIG. 3, in this state, loads are applied to the tip ends of load receiving pieces 96 and 98 (upper ends of the load receiving pieces 96 and 98 in FIG. 3) toward the leg plate 18 by the assembly jig 100 to push into the engagement claw 102 further in the hole portion 122 and to push into the engagement claw 108 further in the hole portion 124. Then, a reaction force from the guide surface 134 is given to the bent portion of the engagement claw 102 and a reaction force from the guide surface 136 is given to the bent portion of the engagement claw 108.

Here, the distance between the connecting pieces 92 and 94 and the distance between the base portion 104 of the engagement claw 102 and the base portion 110 of the engagement claw 108 are approximately equal to the outer diameter of the cylinder 42. Therefore, in the state in which the bent portion of the engagement claw 102 abuts the guide surface 134 and the bent portion of the engagement claw 108 abuts to the guide surface 136, the base portion 104 of the engagement claw 102 or the connecting piece 92 and the base portion 110 of the engagement claw 108 or the connecting piece 94 are in contact (line contact) with the outer periphery of the cylinder 42.

Accordingly, when the reaction force from the guide surface 134 is applied to the bent portion of the engagement claw 102 and the reaction force from the guide surface 136 is applied to the bent portion of the engagement claw 108 in this state as mentioned above, as illustrated in FIG. 4, the tip end side (that is, the claw portion 106 side) is bent (curved) so as to be close to the engagement claw 108 side as the contact portion of the base portion 104 (the engagement claw 102) and the connecting piece 92 which is in contact with the cylinder 42 being center, and the tip end side (that is, the claw portion 112 side) is bent (curved) so as to be close to the engagement claw 102 as the contact portion of the base portion 110 (the engagement claw 108) and the connecting piece 94 which is in contact with the cylinder 42 being center.

Thus, while the base portion 110 (the engagement claw 108) and the connecting piece 94 and the base portion 104 (the engagement claw 102) and the connecting piece 92 are bent, the assembly jig 100 is used to apply the load to each tip end of the load receiving piece 98 and the load receiving piece 96 to push the engagement claws 102 and 108 further into the hole portions 122 and 124, respectively. Then, the claw portion 106 and the tip end side of the base portion 104 in the engagement claw 102 pass through the hole portion main body 126 and the claw portion 112 and the tip end side of the base portion 110 in the engagement claw 108 pass through the hole portion main body 128. In this way, when the claw portion 106 passes through the hole portion main body 126 and the claw portion 112 passes through the hole main body 128, the connecting piece 92 and the base portion 104 (the engagement claw 102) and the connecting piece 94 and the base portion 110 (the engagement claw 108) are recovered to their original flat plate state by their own elasticity.

In this way, as illustrated in FIG. 5, the tip end of the claw portion 106 faces the leg plate 16 side surface of the leg plate 18 at the side of the edge portion of the hole portion main body 126 which side is opposite to the hole portion 124, and the tip end of the claw portion 112 faces the leg plate 16 side surface of the leg plate 18 at the side of the edge portion of the hole portion main body 128 which side is opposite to the hole portion 122. Then, when the holder 80 is pulled toward the outside of the leg plate 18 (opposite side to the leg plate 16) in this state, the claw portions 106 and 112 interfere with the leg plate 18 therefore even if the holder 80 is pulled as described above, the holder 80 cannot be taken out of the leg plate 18.

Here, as described above, the distance between the connecting pieces 92 and 94 and the distance between the base portion 110 of the engagement claw 108 and the base portion 104 of the engagement claw 102 are approximately equal to the outer diameter of the cylinder 42, and in a state in which the holder 80 is mounted on the leg plate 18, the base portion 104 of the engagement claw 102 or the connecting piece 92 is in contact with the outer periphery of the cylinder 42 and the base portion 110 of the engagement claw 108 or the connecting piece 94 is in contact with the outer periphery of the cylinder 42. Then, the base portion 104 of the engagement claw 102 or the connecting piece 92 and the base portion 110 of the engagement claw 108 or the connecting piece 94 sandwich the cylinder 42 and thereby, the displacement of the cylinder 42 in the facing direction of the connecting pieces 92 and 94 is restricted.

Besides, as described above, the distance between the tip end portion of the claw portion 106 or the tip end portion of the claw portion 112 and a surface, at a side facing the leg plate 18, of the pressing piece 82, along the thickness direction of the pressing piece 82, is approximately equal to a length obtained by subtracting a length of the deepest portion of the curved portion 44 from the surface (that is the wall surface of the leg plate 18) at the side facing the pressing piece 82 of the leg plate 18 from a sum of a thickness of the leg plate 18 and the outer diameter of the cylinder 42. Therefore, in a state in which the holder 80 is mounted on the leg plate 18, the pressing piece 82 is in contact with the outer periphery of the cylinder 42, and the cylinder 42 is sandwiched by the pressing piece 82 and the curved portion 44 of the leg plate 18. With this structure, displacement of the cylinder 42 in the facing direction of the leg plate 18 and the pressing piece 82 is restricted.

That is, as the leg plate 18 is mounted on the holder 80, the cylinder 42 is held by the holder 80 (by the leg plate 18 and the holder 80), displacement of the cylinder 42 in the radial direction can be restricted.

In addition, in the present exemplary embodiment, as the holder 80 can be mounted on the leg plate 18 only by applying loads to the tip ends (the upper ends) of the load receiving pieces 96 and 98 and pushing the tip end (the bent portion) sides of the engagement claws 102 and 108 into the hole portions 122 and 124. Therefore, the operation of mounting of the holder 80 onto the leg plate 18 is simple and no component such as screw is required. Thus, as any fastening component such as screw for mounting of the holder 80 onto the leg plate 18 is not required, the component cost is low and as the step of fastening of screw or the like is not required, the cost of assembling can be reduced further.

Further, in the present exemplary embodiment, as described above, the distance between the connecting pieces 92 and 94 and the distance between the base portion 110 of the engagement claw 108 and the base portion 104 of the engagement claw 102 are approximately equal to the outer diameter of the cylinder 42, and when the holder 80 is mounted on the leg plate 18, the connecting piece 92 or the base portion 104 of the engagement claw 102 is in contact with the outer periphery of the cylinder 42 and the connecting piece 94 or the base portion 110 of the engagement claw 108 is in contact with the outer periphery of the cylinder 42 and the cylinder 42 is sandwiched between the base portion 110 of the engagement claw 108 or the connecting piece 94 and the base portion 104 of the engagement claw 102 or the connecting piece 92. With this structure, if the base portion 104, the connecting piece 92 being pressed from the opposite side to the connecting piece 94 at a position further toward the load receiving piece 96 than the contact portion where the connecting piece 92 or the base portion 104 is in contact with the cylinder 42, the side which is further toward the claw portion 106 than the contact portion where the connecting piece 92 or the base portion 104 is in contact with the cylinder 42 does not bend toward the connecting piece 94 side.

Accordingly, in a state in which the holder 80 is mounted on the leg plate 18, the tip end side of the engagement claw 102 including the claw portion 106 is not taken out from the hole portion 122 easily. Besides, as to the connecting piece 94 and the engagement claw 108, if the base portion 110, the connecting piece 94 being pressed from the opposite side to the connecting piece 92 at a position further toward the load receiving piece 98 than the contact portion where the connecting piece 94 or the base portion 110 is in contact with the cylinder 42, the side which is further toward the claw portion 112 than the contact portion where the connecting piece 94 or the base portion 110 is in contact with the cylinder 42 does not bend toward the connecting piece 92 side. Therefore, in a state in which the holder 80 is mounted on the leg plate 18, the tip end side of the engagement claw 108 including the claw portion 112 is not taken out from the hole portion 124. With this structure, the holding of the cylinder 42 by the holder 80 (holding of the cylinder 42 by the holder 80 and the leg plate 18) can be maintained excellent for a long term.

Further, in this exemplary embodiment, the load receiving pieces 96 and 98 are extended in the direction opposite to the extending direction of the engagement claws 102 and 08 from the connecting pieces 92 and 94, and the assembly jig 100 contacts with the tip ends (the upper ends) of the load receiving pieces 96 and 98. Therefore, when the sandwiching pieces 84 to 90 become falling-down (slant) in such a manner that the tip end side of the engagement claw 102 comes close to the tip end side of the engagement claw 108 as the curved portions of the sandwiching pieces 84 to 90 being center due to loads given to the tip ends of the load receiving pieces 96 and 98 by the assembly jig 100, they interfere with the cylinder 42 in the contact portions with the cylinder 42 of the base portions 104 and 110 or the connecting pieces 92 and 94 or the sandwiching pieces 84 to 90. Therefore, it is possible to prevent the sandwiching pieces 84 to 90 from falling down and to mount the holder 80 on the leg plate 18 reliably.

Furthermore, as described above, as the holder 80 may be formed by punching of a metal flat plate and bending it, the cost can be reduced in this way. Further, because the holder 80 maintains the cylinder 42 by not the rigidity thereof but elasticity, and the holder 80 can be made thinner. This contributes to lightening of the webbing winding device 10.

In this exemplary embodiment, the claw portion 106 is formed by bending the tip end side of the engagement claw 102 and the claw portion 112 is formed by bending the tip end side of the engagement claw 108. However, forming of the claw portions 106 and 112 is not limited to this bend-forming. For example, the tip end sides of the engagement claws 102 and 108 may be crushed so as to be thicker than the base end sides, and these thicker portions may be formed into the claw portions 106 and 112.

In addition, in this exemplary embodiment, the guide surface 134 (the guide portion 130) is formed in the hole portion 122 and the guide surface 136 (the guide portion 132) is formed in the hole portion 124. However, depending on orientation of the surface of the claw portion 106 opposite to the engagement claw 108 and orientation of the surface of the claw portion 112 opposite to the engagement claw 102, it is possible that the guide surface 134 (the guide portion 130) and the guide surface 136 (the guide portion 132) is not provided so as to form the hole portions 124 and 122 by the hole main bodies 128 and 126. If so, the connecting piece 92 or the base portion 104 and the connecting piece 94 or the base portion 110 are bent as mentioned above.

Accordingly, the device may be structured without provision of the guide surface 136 (the guide portion 132) and the guide surface 134 (the guide portion 130) in the hole portions 122 and 124. However, if the guide surface 136 (the guide portion 132) and the guide surface 134 (the guide portion 130) are not provided in the hole portions 122 and 124, the opening edges of the hole portions 122 and 124 are in contact with the claw portions 106 and 112 in a so-called "one-side abutted" state. Therefore, the resistance in mounting of the holder 80 onto the leg plate 18 becomes increased. Therefore, in this sense, it is preferable that the guide surface 134 (the guide portion 130) and the guide surface 136 (the guide portion 132) are provided in the hole portion 122 and the hole portion 124.

What is claimed is:

1. A webbing winding device comprising:

a spool that is connected to a base end side in a longitudinal direction of a webbing belt formed in a longitudinal band shape and that winds up the webbing belt from the base end side in the longitudinal direction to accommodate the webbing belt;

a pretensioner that imparts to the spool a rotational force in a direction of winding the webbing belt by activation thereof;

a frame that rotatably supports the spool directly or indirectly, the frame having a wall portion where the pretensioner is disposed to face the wall portion, and a pair of hole portions whose distance therebetween along a predetermined direction parallel to a wall surface of the wall portion facing the pretensioner corresponds to a dimension of a predetermined portion of the pretensioner along the predetermined direction; and a holding member formed in a substantially U-shape opening toward the wall surface and having a pair of leg portions, a distance between the pair of leg portions corresponding to the dimension of the predetermined portion of the pretensioner along the predetermined direction, the holding member holding the pretensioner with the wall portion by the pair of leg portions being engaged with the pair of hole portions respectively, wherein the holding member has load receiving portions formed in a flat plate shape, external force for mounting the holding member to the frame by passing the leg portions through the hole portions respectively being imparted at external force receiving positions of the load receiving portions, the external force receiving positions being set at positions each between a connecting portion connecting the pair of leg portions at a side opposite to the wall portion with respect to the pretensioner and a holding position of the leg portion in contact with the pretensioner to hold the pretensioner.

2. The webbing winding device of claim 1, wherein the holding member holds the pretensioner by sandwiching the pretensioner with the connecting portion and the wall portion and sandwiching the pretensioner with the pair of leg portions.

3. The webbing winding device of claim 2, wherein the pair of leg portions are inserted into the pair of hole portions respectively from a side opposite to the wall portion with respect to the pretensioner.

4. The webbing winding device of claim 1, wherein the holding member has claw portions that are respectively formed outwardly at the leg portions in a facing direction of the pair of leg portions, from tip end sides of the leg portions, the claw portions being interfered with at a surface of the wall portion at a side opposite to the wall surface facing the pretensioner in a state where the leg portions pass through the hole portions respectively.

5. The webbing winding device of claim 4, wherein the predetermined portion of the pretensioner held by the holding member has a shape such that dimension thereof in the facing direction of the leg portions becomes gradually shorter from a position where the predetermined portion of the pretensioner is contacted and sandwiched by the pair of leg portions, toward the wall portion.

6. The webbing winding device of claim 5, wherein the predetermined portion of the pretensioner held by the holding member has a cylindrical shape.

7. The webbing winding device of claim 1, wherein a concave portion whose shape corresponds to an outer peripheral shape of a portion of the predetermined portion of the pretensioner is formed at the wall portion where the predetermined portion of the pretensioner is disposed.

8. The webbing winding device of claim 1, wherein inclined surfaces that guide insertion of the pair of leg portions into the pair of hole portions are respectively formed at openings of the pair of hole portions at a side of the wall surface of the wall portion facing the pretensioner.

9. The webbing winding device of claim 1, wherein the shortest distance between inner peripheral surfaces of the pair of hole portions in a facing direction of the inner peripheral surfaces thereof is shorter than the dimension of the predetermined portion of the pretensioner along the predetermined direction, and the longest distance between the inner peripheral surfaces of the pair of hole portions in the facing direction of the inner peripheral surfaces thereof is longer than the dimension of the predetermined portion of the pretensioner along the predetermined direction.

* * * * *